3,043,830
ACTINOBOLIN AND ITS FERMENTATIVE PRODUCTION
Theodore H. Haskell, Clawson, John Ehrlich, Grosse Pointe Park, Robert F. Pittillo, Grosse Pointe, and Lucia E. Anderson, Detroit, Mich., assignors to Parke, Davis & Company, Detroit, Mich., a corporation of Michigan
Filed Oct. 20, 1958, Ser. No. 768,128
7 Claims. (Cl. 260—236.5)

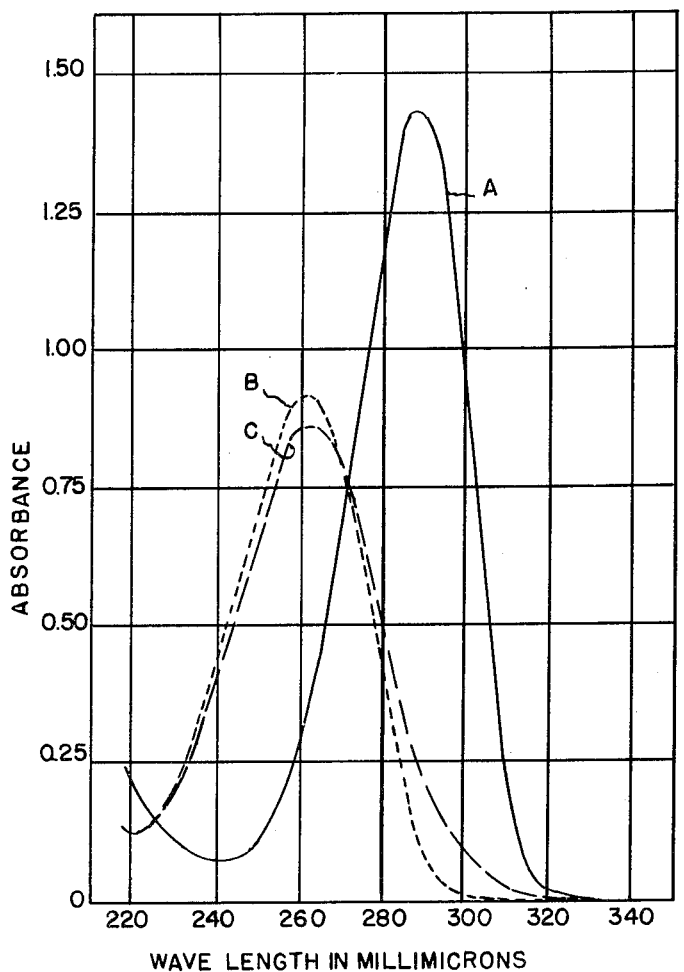

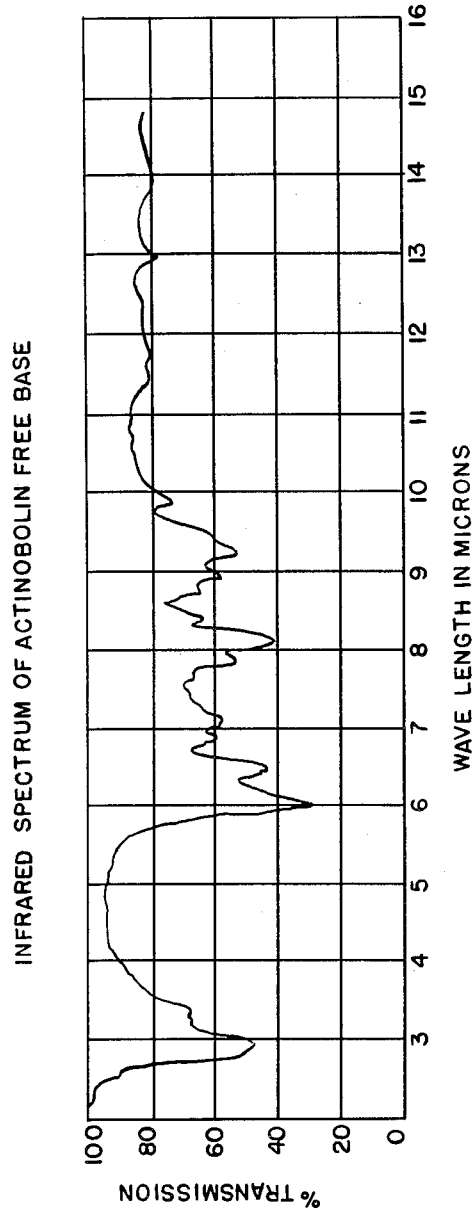

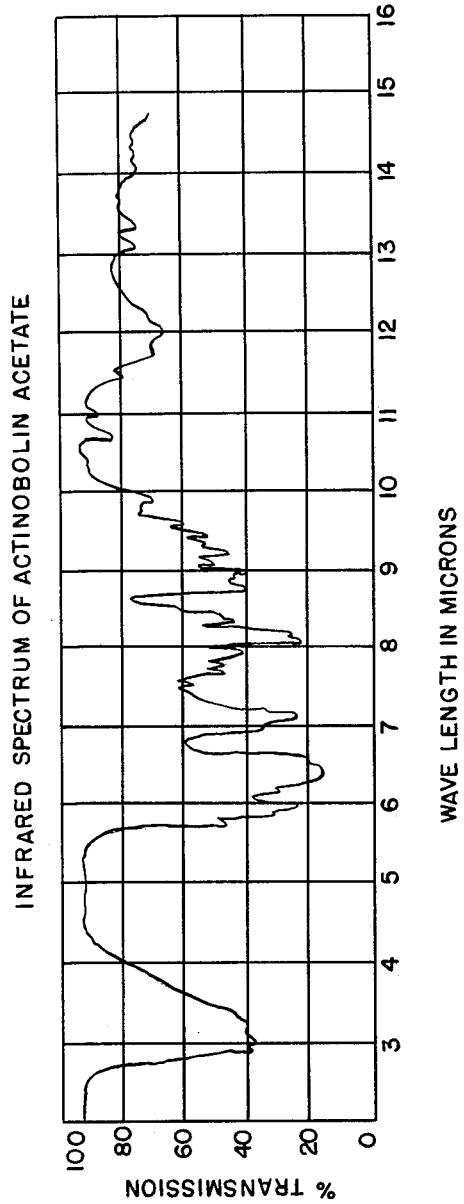

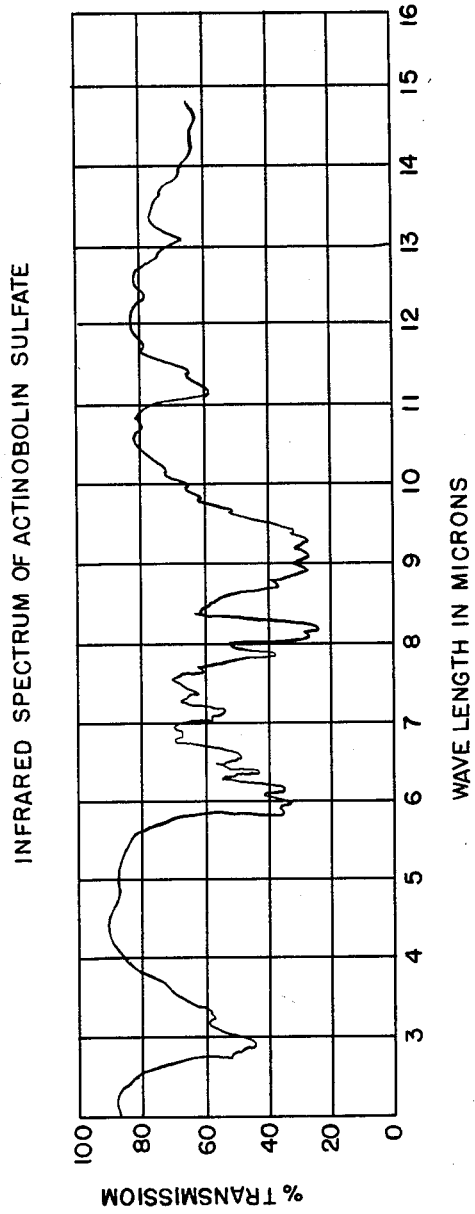

This invention relates to a new chemical substance called actinobolin and acid addition salts thereof and to means for producing the same.

Actinobolin is a white substance containing only the elements carbon, hydrogen, nitrogen and oxygen. Microanalysis of actinobolin and its acid addition salts indicate that actinobolin in its freebase form has the probable empirical formula $C_{13}H_{20-22}N_2O_6$. It is optically active, having a specific rotation $[\alpha]_D^{23}$ of $+59°$ (c.=0.5% in pH 7 phosphate buffer). The molecular weight of actinobolin is about 300.

Actinobolin is very soluble in water and moderately soluble in lower aliphatic alcohols such as methanol and ethanol. It cannot be extracted from aqueous solutions thereof with n-butanol, ethyl ether, amyl acetate, heptane or benzene.

Actinobolin gives a positive ninhydrin test, forms a deep red coloration with ferric chloride, a red-orange color with Pauli diazo reagent, decolorizes an aqueous solution of potassium permanganate in the cold, gives a positive Folin-Ciocalteu test, gives a positive iodoform test and reduces alkaline copper solutions (Fehling's solution). The substance gives a negative Molisch test, a negative Ehrlich (dimethylaminobenzaldehyde) test and a negative Elson-Morgan test. It does not absorb any hydrogen at room temperature and 2 to 3 atmospheres pressure in the presence of Raney nickel catalyst in ether acetic acid or ethanol. It also not does not absorb any hydrogen at room temperature and 2 to 3 atmospheres pressure in the presence of Adam's catalyst in either acetic acid or ethanol.

The new substance is amphoteric. Hydrogen binding titration shows the compound to have pKa's of 7.5 and 8.8. It forms salts with various acids such as sulfuric acid, acetic acid, hydrochloric acid and other mineral and organic acids. The acid salts of actinobolin may be prepared by treating the amphoteric compound with approximately one equivalent of the chosen acid. This can be done in aqueous solution or in a suitable solvent. Conversely, a particular salt of actinobolin can be converted to the free base or a different salt thereof by means which per se are known in the art.

Actinobolin contains one basic nitrogen atom and one non-basic nitrogen atom. It contains at least one OH group. It also contains one

carbonyl group. The carbonyl group does not react with an excess of hydroxylamine hydrochloride in aqueous alcohol at room temperature.

Actinobolin and its acid addition salts are strong chelating agents for ferric iron and the aluminum ion and form complexes with these metals. The aluminum complex is a white amorphorous substance having an optical rotation of $[\alpha]_D^{26}=+138°$ (c.=1% in pH 7 phosphate buffer). The ultraviolet absorption maximum of the aluminum complex occurs at a wave length of 263 millimicrons at pH 7 in phosphate buffer. The iron complex is a deep red color. The substance also forms complexes with the cobaltous and cupric ions. Actinobolin inhibits the growth of microorganism Sarcina lutea PCI 1001 W under conditions favorable to the growth of the micro-organism (c.=0.0125 mg./ml. and greater). Treatment with iodine in aqueous sodium bicarbonate causes rapid destruction of the ability to inhibit the growth of Sarcina lutea PCI 1001 W and the ultraviolet absorbance.

The new substance upon treatment with warm acetic anhydride is converted to N-acetyl actinobolin, a white crystalline substance melting at 254–255° C. (dec.) and exhibiting ultraviolet absorption maxima at 264 millimicrons in phosphate buffer at pH 7, at 262 millimicrons in 0.1 N hydrochloric acid and at 288 millimicrons in 0.1 sodium hydroxide. N-acetyl actinobolin does not inhibit the growth of Sarcina lutea PCI 1001 W (c.=0.74 mg./ml.). Hydrogen binding titration of N-acetyl actinobolin shows it to have a pKa of 8.4.

Treatment of actinobolin with aqueous alkali destroys the ultraviolet absorbancy of the substance and its ability to inhibit the growth of Sarcina lutea PCI 1001 W. Heating the substance at 100° C. with 6 N sulfuric acid causes the evolution of one equivalent of carbon dioxide and the destruction of the ultraviolet absorbance and ability to inhibit the growth of Sarcina lutea PCI 1001 W.

Actinobolin is stable in the solid state. It is stable in aqueous solutions at acidic pH's particularly in the neighborhood of pH 3. For example, it is stable in aqueous solutions at pH 3 at 37° C. for seven days. It is quite unstable in aqueous solutions having a pH of 7 or more. For example, approximately 70% of the actinobolin present in an aqueous solution having a pH of 7 is destroyed after 72 hours at room temperature.

Actinobolin is characterized by unique ultraviolet and infrared absorption spectra. In the drawings FIGURE 1 represents the ultraviolet absorption spectrum of actinobolin obtained in alkaline solution (curve A), acid solution (curve B), and in pH 7 solution (curve C). FIGURE 2 represents the infrared absorption spectrum of actinobolin.

The ultraviolet absorption spectrum of actinobolin in pH 7 phosphate buffer is characterized by a maximum at a wave-length of 263 millimicrons; in 0.1 N hydrochloric acid, 262 millimicrons; and in 0.1 sodium hydroxide, 288 millimicrons.

The infrared absorption spectrum of actinobolin is characterized by maxima at wave-lengths of 2.90, 3.20, 3.30, 3.36, 6.04, 6.27, 6.85, 7.09, 7.86, 8.10, 8.39, 8.77, 8.95, 9.28, 9.45, 9.93, 11.42, 11.74 and 13.08 microns.

As mentioned above, actinobolin forms salts with acids. One of these salts, actinobolin acetate, is a white, crystalline substance containing only the elements carbon, hydrogen, nitrogen and oxygen. Microanalysis indicates that this salt has the probable empirical formula

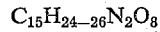

It is optically active having a rotation of $[\alpha]_D^{26}=+58°$ (c.=0.5% in water).

Actinobolin acetate is very soluble in water, less soluble in warm absolute ethanol, sparingly soluble in cold absolute ethanol, soluble in warm acetone and sparingly soluble in ethyl acetate. It cannot be extracted from aqueous solutions thereof with n-butanol, ethyl ether, amyl acetate, heptane or benzene.

Actinobolin acetate gives a positive ninhydrin test, forms a deep red coloration with ferric chloride, a red-orange color with Pauli diazo reagent, decolorizes an aqueous solution of potassium permanganate in the cold, gives a positive Folin-Ciocalteu test, gives a positive iodoform test and reduces alkaline copper solutions (Fehling's solution). The substance gives a negative Molisch test, a negative Ehrlich (dimethylaminobenzaldehyde) test and a negative Elson-Morgan test. It does not absorb any hydrogen at room temperature and 2 to 3 atmospheres pressure in the presence of Raney nickel catalyst in either acetic acid or ethanol. It also does not absorb any hydrogen at room temperature and 2 to 3 atmospheres pressure in the presence of Adams' catalyst in either acetic acid or ethanol.

Hydrogen binding titration of actinobolin acetate shows the substance to have pKa's of 4.6, 7.5 and 8.8.

Actinobolin acetate contains one non-basic nitrogen atom and one nitrogen atom in salt formation. It contains at least one OH group. It also contains one carbonyl group which does not react with excess hydroxylamine hydrochloride in aqueous alcohol at room temperature.

The acetate salt readily forms complexes with ferric iron and ionic aluminum which are identical with those produced from actinobolin free base. It also forms complexes with cupric and cobaltous ions.

Actinolobin acetate inhibits the growth of Sarcina lutea PCI 1001 W. Treatment with iodine in aqueous sodium bicarbonate solution causes rapid destruction of the ability to inhibit the growth of Sarcina lutea PCI 1001 W and the ultraviolet absorbance. Treatment of the substance with aqueous alkali also destroys the ultraviolet absorbancy of the compound and its ability to inhibit the growth of Sarcina lutea PCI 1001 W. Warming at 100° C. with 6 N sulfuric acid causes the liberation of one equivalent of carbon dioxide, destruction of the ability to inhibit the growth of Sarcina lutea PCI 1001 W and destruction of the ultraviolet absorbance. Upon treatment with warm acetic anhydride actinobolin acetate is converted to N-acetyl actinobolin which has the same properties as the N-acetyl actinobolin prepared from the free base.

Actinobolin acetate is stable in the solid state. In aqueous solutions it exhibits the same stability characteristics as actinobolin itself.

The $R_f$ value of actinobolin acetate in an n-butanol (10), acetic acid (1), water (4) system is in the range from 0.12 to 0.19, this value representing the ratio of the movement on an ascending paper strip of the solvent front to the movement of actinobolin acetate.

Actinobolin acetate possesses unique infrared and ultraviolet absorption spectra. In the drawings FIGURE 3 represents the infrared absorption spectrum of actinobolin acetate.

The infrared spectrum of actinobolin acetate is characterized by maxima at wave-lengths of 2.98, 3.07, 3.26, 5.81, 5.98, 6.20, 6.45, 6.58, 6.97, 7.09, 7.69, 7.80, 7.92, 8.11, 8.20, 8.37, 8.77, 8.96, 9.10, 9.26, 9.47, 9.63, 10.78, 11.78, 12.07, 13.15 and 13.38 microns. The ultraviolet spectrum of actinobolin acetate in pH 7 phosphate buffer is characterized by a maximum at a wave-length of 264 millimicrons; in 0.1 N hydrochloric acid, 262.5 millimicrons; and in 0.1 N sodium hydroxide, 289 millimicrons.

Actinobolin acetate partially melts at 128–133° C., resolidifies at approximately 145° C. and finally melts with decomposition at 263–266° C.

Another of the aforementioned salts of actinobolin, namely actinobolin sulfate, is a white crystalline substance containing only the elements carbon, hydrogen, oxygen, nitrogen and sulfur. This salt crystallizes from aqueous ethanol in the form of a hydrate which microanalysis indicates to have the probable empirical formula, $C_{13}H_{22-24}N_2O_6 \cdot \frac{1}{2}H_2SO_4 \cdot H_2O$. It is optically active and has a rotation of $[\alpha]_D^{26} = +54.5°$ (c. =1% in water).

Actinobolin sulfate is very soluble in water and very sparingly soluble in absolute ethanol and insoluble in other less polar organic solvents such as acetone, ether, etc. It cannot be extracted from aqueous solutions with n-butanol, ethyl ether, amyl acetate, heptane or benzene.

Actinobolin sulfate gives a positive ninhydrin test, forms a deep red coloration with ferric chloride, a red-orange color with Pauli diazo reagent, decolorizes an aqueous solution of potassium permanganate in the cold, gives a positive Folin-Ciocalteu test, gives a positive iodoform test and reduces alkaline copper solutions (Fehling's solution). The substance gives a negative Molisch test, a negative Ehrlich (dimethylaminobenzaldehyde) test and a negative Elson-Morgan test. It does not absorb any hydrogen at room temperature and 2 to 3 atmospheres pressure in the presence of Raney nickel catalyst in either acetic acid or ethanol. It also does not absorb any hydrogen at room temperature and 2 to 3 atmospheres pressure in the presence of Adams' catalyst in either acetic acid or ethanol.

Hydrogen binding titration of actinobolin sulfate shows the substance to have pKa's 7.5 and 8.8.

Actinobolin sulfate contains one non-basic nitrogen atom and one nitrogen atom in salt formation. It contains at least one OH group. It also contains one carbonyl group which does not react with excess hydroxylamine hydrochloride in aqueous alcohol at room temperature. Actinobolin sulfate rapidly reacts with ferric iron and ionic aluminum to form complexes which are identical with those formed by actinobolin itself. It also forms complexes with cupric and cobaltous ions.

Actinobolin sulfate inhibits the growth of Sarcina lutea PCI 1001 W. Treatment with iodine in aqueous sodium bicarbonate solution causes rapid destruction of the ultraviolet absorbance and the ability to inhibit the growth of Sarcina lutea PCI 1001 W. Treatment of the substance with aqueous alkali also destroys the ultraviolet absorbance and the ability to inhibit the growth of Sarcina lutea PCI 1001 W. Warming the salt at 100° C. with 6 N sulfuric acid causes the liberation of one equivalent of carbon dioxide, the destruction of the ultraviolet absorbance and destruction of the ability to inhibit Sarcina lutea PCI 1001W.

Actinobolin sulfate is stable in the solid state. In aqueous solution it exhibits the same stability characteristics as actinobolin itself.

Actinobolin sulfate possesses unique infrared and ultraviolet spectra. In the drawings FIGURE 4 represents the infrared spectrum of actinobolin sulfate, with reference to which characteristic maxima are present at wavelengths of 2.90, 3.26, 5.90, 6.00, 6.18, 6.39, 6.59, 7.16, 7.85, 8.12, 8.21, 8.75, 8.96, 9.15, 9.32, 9.46, 11.20, 12.40 and 13.16 microns. The ultraviolet spectrum in pH 7 phosphate buffer is characterized by an absorption maximum at 264 millimicrons; in 0.1 N hydrochloric acid, 263 millimicrons; and in 0.1 N sodium hydroxide, 288 millimicrons.

Actinobolin can be prepared in accordance with the invention by cultivating an organism called Streptomyces griseoviridus var. atrofaciens under artificial conditions in a suitable nutrient medium and separating the desired actinobolin from the medium preferably by chromatographic means. Actinobolin is most conveniently isolated by these means in the form of the sulfate salt. The production of actinobolin is described hereinafter.

Streptomyces griseoviridus var. atrofaciens is a hitherto unknown microorganism which occurs in soils. Cultures of this microorganism can be obtained by preparing a suspension in sterile water of a soil sample containing it, allowing the heavier particles to settle, plating out the resulting super-natant soil suspension in serial dilution on nutrient agar plates, incubating the plates at 24 to 28° C. to provide microorganism growths and transplanting selected individual growths resembling S. griseoviridus var. atrofaciens to fresh nutrient agar plates. Upon repeated selection and transplanting of uncontaminated and characteristic growths to fresh nutrient agar plates, thalli constituting pure cultures of the desired microorganism are obtained.

S. griseoviridus var. atrofaciens is an aerobic and aerially sporulating member of the order Actinomycetales and belongs to the genus Streptomyces as described in the sixth edition of Bergey's Manual of Determinative Bacteriology. When cultivated on glycerol-asparagine agar medium, the primary substratal mycelium is yellow to yellow-green, occasionally becoming black, the aerial mycelium is light yellow-green to pink, and a green-black to black color is occasionally formed in the substrate. On starch-synthetic agar medium, the substratal mycelium is green-gray to black, the aerial mycelium is light green to pink, and a green-black to black color is formed in the substrate. On glucose-tryptone agar medium, the substratal mycelium is green-grey to black, the aerial mycelium is pink, occasionally becoming green, and a green-black to black color is formed in the substrate. On Anderson's sporulation agar medium, the substratal mycelium is yellow-orange to brown, the aerial mycelium is pink, occasionally becoming green, and little or no color is formed in the substrate. The aerial mycelium of this organism on these agar media is sometimes beaded with hyaline droplets and the color is often formed in both *S. griseus* and *S. lavendulae* in color of aerial mycelium, and its aerial hyphae resembles those of *S. griseoviridus* var. *atrofaciens* in that they form lateral loops and spirals. *Streptomyces griseoviridus* var. *atrofaciens* resembles *S. griseoviridus* in color of aerial mycelium, but the pink and green shades are not as dark. *S. griseoviridus* var. *atrofaciens* forms a black color in synthetic agar medium while *S. griseoviridus* does not. *S. griseoviridus* var. *atrofaciens* does not usually form a dark color in Anderson's sporulation agar, Difco nutrient agar, or gelatin, while *S. griseoviridus* does as illustrated in Table 1. In carbon utilization tests, *S. griseoviridus* var. *atrofaciens* utilizes i-inositol, whereas *S. griseoviridus* does not utilize inositol; and *S. griseoviridus* var. *atrofaciens* does not utilize rhamnose, while *S. griseoviridus* does, as illustrated in Table 2.

TABLE 1

Comparison of Coloration of S. griseoviridus var. atrofaciens and S. griseoviridus Cultured on Various Agar Media

| Agar Medium | Feature | S. griseoviridus var. atrofaciens | S. griseoviridus NRRL 2427 |
| --- | --- | --- | --- |
| Glycerol-asparagine | Substratal mycelium | Yellow to yellow-green to black | Light yellow to gray. |
|  | Aerial mycelium | Light yellow-green (18-D, E-1)[1] to pink (2-A, B-8). | Pink-tan to gray-green (11-B, C-2). |
|  | Substrate | Occasionally black | None. |
| Starch-synthetic | Substratal mycelium | Green-gray to black | Tan-gray to black. |
|  | Aerial mycelium | Light green to pink | Tan to light brown. |
|  | Substrate | Green-black to black | None or light gray. |
| Difco nutrient | Substratal mycelium | Light yellow-gray | Yellow to green-gray to brown. |
|  | Aerial mycelium | White (aerial sparse) | Gray-pink to gray-green. |
|  | Substrate | None | Light brown. |
| Glucose-tryptone | Substratal mycelium | Green-gray to black | Light brown to red-brown to black. |
|  | Aerial mycelium | Pink (2-B, C-8) to gray-pink (4-C-7), occasionally greenish. | Pink-gray (6-C-1) to green-brown (13-B-2,3). |
|  | Substrate | Green-black to black | Brown (red-brown near substratal mycelium). |
| Anderson's sporulation | Substratal mycelium | Yellow-orange to brown | Light brown to dark brown. |
|  | Aerial mycelium | Pink (2-A, B-7,8), occasionally greenish. | Pink-brown (12-4-A), occasionally greenish. |
|  | Substrate | None | Brown. |

[1] Maerz & Paul, Dictionary of Color, second edition, 1950.

concentric bands of white, pink, and occasionally green. Colonies are at first moist, circular, and convex, and later usually become raised or pulvinate with depressed centers and radially furrowed and irregularly wrinkled surfaces. The margins are at first entire, later becoming undulate. The formulae for the culture media mentioned in this paragraph are given in the Bulletin of the Torrey Bontanical Club, volume 82, page 110, 1955.

The primary aerial hyphae are moderately long with looped and spiralled lateral branches occurring singly and in clusters. Distal portions of aerial hyphae subdivide into chains of unicellular, spherical to elongate, spores.

In synthetic agar medium good to heavy growth is obtained with L-arabinose, cellobiose, dextrin, dextrose, D-galactose, glycerol, i-inositol, levulose, maltose, D-mannitol, D-mannose, starch, trehalose or D-xylose; poor growth with lactose and salicin; and no growth is obtained with adonitol, aesculin, dulcitol, inulin, melezitose, melibiose, raffinose, rhamnose, D-sorbitol or sucrose as carbon source. The organism liquefies gelatin but little or no color is formed in the medium. The organism also peptonizes litmus milk, the reaction of the substrate becoming basic.

The green color of the aerial mycelium of *S. griseoviridus* var. *atrofaciens* resembles that of *S. griseus* [sixth edition of Bergey's Manual of Determinative Bacteriology] and the pink color of the aerial mycelium of *S. griseoviridus* var. *atrofaciens* resembles that of *S. lavendulae* [sixth edition of Bergey's Manual of Determinative Bacteriology]; but *S. griseoviridus* var. *atrofaciens* differs from both these species in micromorphology. *S. griseoviridus* sp. nov. [Antibiotics and Chemotherapy, vol. VI, No. 2, pages 100–115 (1956)], a source of the antibiotics, griseoviridin and viridogrisein, also resembles

TABLE 2

Comparison of Carbon Utilization of S. griseoviridus var. atrofaciens and S. griseoviridus

| Carbon Source [1] | S. griseoviridus var. atrofaciens | S. griseoviridus NRRL 2427 |
| --- | --- | --- |
| L-Arabinose | 4 | 3 to 4. |
| Rhamnose | 0 | 3 to 4. |
| D-Xylose | 3 to 4 | 2 to 3. |
| Dextrose | 4 | 3 to 4. |
| D-Galactose | 4 | 3 to 4. |
| Levulose | 4 | 1 to 2. |
| D-Mannose | 4 | 2 to 4. |
| Cellobiose | 4 | 3 to 4. |
| Lactose | 0 to 1 | 2 to 4. |
| Maltose | 3 to 4 | 4. |
| Melibiose | 0 | 0. |
| Sucrose | 0 | 0. |
| Trehalose | 4 | 4. |
| Melezitose | 0 | 0. |
| Raffinose | 0 | 0. |
| Dextrin | 4 | 4. |
| Inulin | 0 | 0. |
| Starch | 3 to 4 | 3 to 4. |
| Adonitol | 0 | 0. |
| Dulcitol | 0 | 0. |
| Glycerol | 4 | 3 to 4. |
| i-Inositol | 4 | 0. |
| D-Mannitol | 4 | 4. |
| D-Sorbitol | 0 | 0. |
| Aesculin | 0 | 0. |
| Salicin | 0 to 1 | 0 to 1. |
| Control | 0 | 0. |

[1] Each carbon source tested at a concentration of 1 percent by weight in the synthetic agar medium of Pridham & Gottlieb, J. Bact., 56, 108, 1948.

0=No growth.  1=Poor growth.  2=Fair growth.  3=Good growth.  4=Very heavy growth.

Since *S. griseoviridus* var. *atrofaciens* closely resembles *S. griseoviridus* in morphology and in certain respects in color of aerial mycelium but differs from *S. griseoviridus* in (1) formation of a pronounced black color in synthetic agar medium but does not form a dark color in certain media containing organic nitrogen, (2) utilization of some carbon sources, and (3) types of substance elaborated, we consider it to belong with *S. griseoviridus* but to represent a distinct, new variety of this species. Cultures of *S. griseoviridus* var. *atrofaciens* are being maintained in the permanent culture collection of Parke, Davis & Company Culture Bureau, Detroit, Michigan, under Nos. 04999 and 05000, and in the Culture Collection of the Fermentation Division, Northern Utilization Research Branch, United States Department of Agriculture, Peoria, Illinois, under NRRL Nos. 2715 and 2563, respectively.

The production of actinobolin in accordance with the invention is carried out by inoculating a sterile aqueous nutrient medium with *S. griseoviridus* var. *atrofaciens*, incubating the inoculated medium under aseptic aerobic conditions at a temperature between about 20 to 35° C., removing the solid material present in the culture mixture and isolating the desired actinobolin from the aqueous culture liquid.

For the inoculation, spores of *S. griseoviridus* var. *atrofaciens* can be used. Aqueous suspensions of the same containing a minor proportion of soap or other wetting agent can also be used. For large fermentations it is preferable to use vigorous, young, aerated and agitated broth cultures of the microorganism.

Suitable aqueous nutrient media are those having a pH between 6 and 8.5 and containing an assimilable carbon source and a source of nitrogen and minerals. As assimilable carbon sources, either the pure carbohydrates or commercially available carbohydrate mixtures may be used. Some examples of the materials which are suitable for this purpose include glucose, *d*-mannose, *d*-galactose, corn syrup, starch, soluble starch, malt liquors, blackstrap molasses, hydrolyzed starches, glycerin and the like. The quantity of the carbohydrate present in the nutrient medium is not particularly critical and can vary from about 0.5% to 5% by weight of the total weight of the medium.

The source of nitrogen in the nutrient medium may be of an organic, inorganic, or mixed organic-inorganic nature. Some examples of the many nitrogenous substances which may be employed in the nutrient medium are amino acids, peptones, hydrolyzed and unhydrolyzed proteins, fish meal, soybean meal, corn steep liquor, meat extracts, peanut meal, inorganic nitrates, urea, ammonium salts and the like. Due to the crude nature of most of the readily available nitrogenous substances, the quantity to be added to the nutrient medium varies somewhat in accordance with purity. However, it can be said for practical purposes that nitrogenous materials need not exceed 6% by weight of the total weight of the fermentation medium.

A certain amount of mineral salts is necessary to obtain the best yields of actinobolin. In general, many crude materials, such as corn steep liquor, butanol-acetone fermentation residues, yeast preparations, soybean oil meal, etc. contain mineral salts in sufficient amounts. However, in order to insure the presence of adequate amounts of the mineral components of the medium, it is usually advantageous to add a small amount of inorganic salts, such as sodium chloride, sodium bicarbonate, calcium carbonate, sodium acetate and the like. The preferred concentration of mineral salts is between 0.1 and 1% of the nutrient medium.

The cultivation of *S. griseoviridus* var. *atrofaciens* in the aqueous nutrient medium can be carried out in a number of different ways. For example, the microorganism can be cultivated under aerobic conditions on the surface of the medium or it can be cultivated beneath the surface of the medium, that is, in submerged condition, if oxygen is simultaneously supplied.

The preferred method for producing actinobolin on a large scale involves the use of submerged or deep cultures of *S. griseoviridus* var. *atrofaciens*. According to this embodiment of the invention, a sterile, aqueous nutrient medium is inoculated with *S. griseoviridus* var. *atrofaciens* and incubated with agitation and aeration at a temperature between about 20 to 35° C., until a maximum concentration of actinobolin has been produced in the culture liquid. The length of time required for the maximum production of actinobolin varies with the size and type of equipment used. For example, in large-scale commercial fermentation such as are carried out in the tank-type fermentors, maximum production of actinobolin is reached in about three to six days. Incubation can be limited to shorter periods of time but the yields are usually inferior. Longer incubation periods do not appear to decrease the amount of actinobolin present in the culture liquid. When shaker flasks are used for the incubation, the time of maximum production may be slightly longer than that required for the large-scale fermentation vats. Under the submerged culture conditions, the microorganism develops as more or less discrete particles dispersed throughout the nutrient medium in contrast to the more or less continuous pellicle present on the surface of the medium in the surface culture method. By virtue of this distribution of the organism throughout the medium, large volumes of the inoculated nutrient medium can be cultivated at one time in the large tanks and vats customarily employed in the fermentation industry. Stationary vat fermentors equipped with suitable agitation and aeration devices as well as horizontal rotary drum fermentaors have been found to be particularly useful in this respect. However, for the preparation of smaller quantities of the antibiotic or of cultures of the microorganism, the submerged culture method may be carried out in small flasks or jars which are either shaken or stirred by suitable mechanical means.

Agitation and aeration of the culture mixture may be accomplished in a number of ways. Agitation may be provided by turbines, paddles, impellers or other mechanical agitation devices, by revolving or shaking the fermentor itself, by various pumping devices or by the passage of air through the medium. Aeration may be effected by injecting air into the fermentation mixture through open pipes, perforated pipes, porous diffusion media such as carbon sticks, carborundum, sintered glass and the like, or it may be provided by spraying, splashing or spilling the mash into or through an oxygen-containing atmosphere.

During and subsequent to incubation, the presence of the desired product and the approximate amount thereof in fermentation liquors and the like can be determined by the disc-plate assay method. This is conveniently done by introducing a representative aliquot from a solution or suspension under test into a plate culture of of the microorganism *Sarcina lutea* PCI 1001 W under conditions normally favorable to growth of the microorganism and observing the inhibition of growth in the zone of introduction. Since actinobolin is characteristically antagonistic to the growth of the organism, the resulting area of inhibition varies directly with the quantity of actinobolin present. As an illustration of this, a beer containing 120 units of actinobolin per milliliter and diluted 120-fold gives an average inhibition zone-diameter of 14.6 millimeters. For convenience, a "unit" of actinobolin is defined as the quantity giving the inhibition zone-diameter mentioned. Hence, the concentrations of samples of unknown potency can be readily determined or assayed employing the method indicated wherein the average diameter of the resulting zone of inhibition of the growth of *Sarcina lutea* PCI 1001 W is a direct measure, with relation to the adopted zone-dilution parameters, of the quantity of actinobolin present. A description of the details of this assay method and the preparation of culture plates follows.

PREPARATION OF CULTURE PLATES

Nutrient agar [Penassay Seed Agar (Difco)] composed of

| | |
|---|---|
| Beef extract (Bacto) | g-- 1.5 |
| Yeast extract (Bacto) | g-- 3.0 |
| Casitone (Bacto) | g-- 4.0 |
| Peptone (Bacto) | g-- 6.0 |
| Dextrose (Bacto) | g-- 1.0 |
| Agar | g-- 15.0 |
| Water, distilled | liter-- 1 | is placed in Roux bottles, inoculated with *Sarcina lutea* PCI 1001 W and incubated at 28° C. for eighteen hours. The growth is harvested in a broth [Penassay Broth (Difco)] composed of

| | |
|---|---|
| Beef extract (Bacto) | g-- 1.5 |
| Yeast extract (Bacto) | g-- 1.5 |
| Pepton (Bacto) | g-- 5.0 |
| Dextrose (Bacto) | g-- 1.0 |
| Sodium chloride | g-- 3.5 |
| Dipotassium phosphate | g-- 3.68 |
| Monopotassium phosphate | g-- 1.32 |
| Water, distilled | liter-- 1 | and the suspension adjusted so that at 1:10 dilution gives 16% light transmission in a spectrophotometer at a wavelength of 555 millimicrons.

The suspension so obtained is mixed with seed agar having the composition just mentioned in a concentration of 1:600. Trays, measuring 5 x 10 inches, are then prepared, each containing 25 ml. of the seeded agar, and are held under refrigeration for ultimate use.

ASSAY METHOD

A sample of unknown actinobolin potency is diluted in pH 7.8 phosphate buffer to the extent required to provide a solution having a concentration of 0.1 M with respect to phosphate and of approximately 10 to 20 actinobolin units per milliliter. A one-half inch filter paper disc or pad is placed on the culture tray or plate prepared in the manner mentioned above and simultaneously dosed with 0.08 ml. of the diluted sample. The tray or plate is incubated at 37° C. for eighteen hours after which the diameter in millimeters of the zone of inhibition is measured. The observed measurement is referred to a standard curve setting forth average inhibition-zone diameters corresponding to actinobolin solutions of known potency in the range of 1 to 120 units per milliliter. From this curve the concentration of the test sample is noted.

After completion of the fermentation phase of the process, the solid material present in the culture mixture is removed by any suitable means such as filtration, centrifugation, etc., and the desired actinobolin is isolated from the residual culture liquid. Isolation is conveniently accomplished by adsorption and elution from an adsorbent for actinobolin such as activated carbon followed by concentration of the eluate. The product can be conveniently obtained as a purified concentrate by further adsorption and elution from an alumina-silicate cation exchange adsorbent such as Decalso and then from activated carbon. The purified concentrate can be converted to crystalline form by either fractional precipitation, adsorption and elution from a cation exchange resin, or treatment with a chelating agent.

In the preparation of actinobolin in concentrated form, as indicated above, the culture liquid remaining after removal of solid material from the fermentation culture mixture is adjusted to a pH within the range of about 3 to 6 and is then subjected to adsorption on activated charcoal and elution following which the concentrate is isolated from the eluate preferably by concentration thereof. Adsorption can be conveniently carried out by adding a quantity of activated carbon preferably with a like amount of a filter aid, such as diatomaceous earth, to the culture liquid and isolating the carbon containing the desired adsorbed actinobolin from the liquid. Also, adsorption can be accomplished by percolating the culture liquid containing actinobolin through an adsorption column containing activated carbon preferably in admixture with a like amount of a filter aid, such as diatomaceous earth. Following adsorption the adsorbent is washed with water and the actinobolin eluted with a suitable eluant such as dilute aqueous acetone. For this purpose water containing from about 20 to 80% of acetone is preferred. Actinobolin in concentrated form can be obtained from the resulting eluate, by concentrating the same under vacuum.

For the purification of the actinobolin concentrate an aqueous solution of the concentrate is subjected to further adsorption and elution from a synthetic silicate adsorbent which has been previously adjusted with acid to a pH in the range of 5.5 to 6.5. In accordance with this method the adsorbed actinobolin is washed with water, and then eluted with a suitable eluant such as aqueous acetone, aqueous acetic acid, acidic aqueous alcohol mixtures and the like. A preferred eluant for this purpose is a mixture containing 5% acetic acid, 10% ethanol, and 85% water. Following elution the eluant is removed and the residual product dissolved in water and further subjected to adsorption and elution from activated carbon in the manner indicated above. The resulting eluate can be concentrated to yield the acetate salt form of actinobolin in a purified form which may then be converted, if desired, to crystalline actinobolin acetate.

One satisfactory method of obtaining crystalline actinobolin acetate involves subjecting solutions of the purified concentrate to fractional precipitation with various solvents. The solvent systems employed are such that actinobolin remains in solution while any foreign material present is caused to precipitate, a separation then being made of the actinobolin acetate phase from the solid phase. In accordance with a preferred embodiment of this method, absolute ethanol is added to an aqueous solution of actinobolin and the resulting precipitate removed by any suitable means. Acetone is added to the residual solution and the resulting precipitate removed. The residual solution is concentrated to dryness, extracted with acetone and the resulting precipitate removed. Ether is added to the residual solution after concentration and the resulting precipitate removed. The residual liquid is concentrated to dryness, the residue allowed to crystallize, and if desired the crystalline residue is recrystallized from a suitable solvent such as acetone, hot ethanol and the like.

Crystalline actinobolin acetate can also be obtained by chromatographic methods. In accordance with a preferred chromatographic method an aqueous solution of the purified concentrate is percolated through a column containing a carboxylic ion exchange resin in the hydrogen cycle and the column is washed with water. The percolate and washing are collected and dried from the frozen state under high vacuum. The resulting residual product is crystallized from a suitable solvent such as hot acetone, hot ethanol and the like. The crystalline product can be further recrystallized from similar solvents if desired.

Crystalline actinobolin acetate can also be obtained by treatment with a chelating agent. In accordance with a preferred method an aqueous solution of a chelating agent such as ethylenediaminetetraacetic acid is added to the purified concentrate until the resulting solution is free of color. The colorless solution is concentrated to dryness from the frozen state and the residual product extracted with a suitable solvent such as acetone. The solvent is removed from the extract by evaporation. A water-immiscible solvent such as ethyl acetate is added to the residual product and the precipitate which forms is collected and recrystallized from a suitable solvent such as absolute ethanol.

The acetate salt of actinobolin can be conveniently converted to the corresponding sulfate salt by acidifying an aqueous solution thereof with sulfuric acid, contacting the acidified solution with an anion exchange adsorbent in the hydroxyl form, separating the adsorbant from the solution and recovering actinobolin sulfate from the solution. The free base of actinobolin can be conveniently obtained from an aqueous solution of actinobolin sulfate by contacting the latter with an anion exchange adsorbent in the hydroxyl form to cause anion adsorption thereon, washing the adsorbate with water, collecting the alkaline wash and recovering actinobolin from the wash by freeze-drying or other convenient means.

Actinobolin and salts thereof are useful as chelating agents. In particular, actinobolin and its salts are useful agents for the removal of trace amounts of iron from aqueous biological and medicinal products and from aqueous solutions intended for parenteral administration. For example, a solution containing the quaternary tetraethylammonium chloride (Etamon chloride) and an undesirable contaminating quantity of soluble iron is treated with an equivalent quantity of actinobolin or a salt thereof to form an iron-actinobolin complex, the resulting solution is contacted with iron-free activated carbon and the purified, iron-free solution separated from the carbon leaving the unwanted iron complex as a carbon adsorbate.

The invention is illustrated by the following examples:

EXAMPLE 1

Sixteen liters of nutrient medium having the following composition:

| | Percent |
|---|---|
| Glucose monohydrate | 1.0 |
| Soybean oil meal | 1.0 |
| Hog stomach, saline extracted | 0.5 |
| Ammonium chloride | 0.167 |
| Sodium chloride | 0.5 |
| Calcium carbonate | 0.1 |
| Sodium hydroxide (10 N) to pH 7.5, and water sufficient to make | 100.0 | are placed in a 30-liter fermentor equipped with sparger, impeller, baffles and sampling line, and the medium is sterilized by heating at 121° for two hours. The medium is cooled and inoculated with 20 ml. of a suspension of spores from two Anderson's sporulation agar slant cultures of *S. griseoviridus* var. *atrofaciens* in sterile 0.1% sodium heptadecyl sulfate solution. The inoculated culture mixture is incubated at 26° C. for fifty-seven hours during which time the mixture is stirred at 230 r.p.m. and sterile air is passed into the medium through the sparger at the rate of 16 liters per minute. The resulting incubated culture mixture is employed as inoculum for further incubation described immediately hereinafter.

Sixty-four liters of nutrient medium having the composition described above is placed in equal portions in four 30-liter fermentors and the several portions sterilized by heating at 121° C. for two hours and allowed to cool. The nutrient medium in each of the fermentors is inoculated with 800 ml. of the incubated culture mixture described above and incubated at 26° C. for seventy-two hours during which time agitation and aeration are provided in the manner described above. Foaming during the incubation is controlled by the addition, as required, of a sterile mixture of crude lard and mineral oils containing mono- and di-glycerides. Periodically throughout the incubation, assay is made of the actinobolin activity in representative samples taken from the culture mixture of which the following result is typical:

| Elapsed incubation time (hours): | Actinobolin activity [1] (units/ml.) |
|---|---|
| 0 | – |
| 8 | 5 |
| 16 | 23 |
| 24 | 45 |
| 32 | 47 |
| 40 | 63 |
| 48 | 78 |
| 56 | 105 |
| 64 | 120 |
| 72 | 121 |

[1] Determined by inhibition of the growth of *Sarcina lutea* PCI 1001 W.

The resulting incubated culture mixtures are adjusted with concentrated sulfuric acid to pH 2.0 and filtered. Filtration is accomplished by slurrying with 2.0% (w./v.) diatomaceous earth (such as Celite #545) and passing through a bed prepared with 2.0% (w./v.) slurry of diatomaceous earth in water. The filtrate pool 43 liters assaying 115 units per milliliter, is adjusted with 10 N sodium hydroxide solution to pH 4.0 to 4.5, 2.2 kg. of activated charcoal (Darco G–60) and 2.2 kg. of diatomaceous earth are added, and the mixture is stirred for one-half hour and then filtered through a frame press under suction. The filter cake is washed with 20 liters of water, removed and slurried with water and pumped into a 6-inch glass column. The column bed is packed under a pressure of five pounds per square inch and is then eluted with 20 to 25% aqueous acetone. Crude actinobolin is obtained by removing the acetone from the resulting eluate and drying the residue from the frozen state. The course of actinobolin removal from the column is ascertained by assaying various fractions of the eluate received subsequent to the acetone-front "break-through," of which the following result is typical:

| Eluate Fraction | Dry Weight (grams) | Actinobolin Activity (units/mg.) |
|---|---|---|
| First liter after acetone front | 35 | 10 |
| Next liter | 9.36 | 42 |
| Next four liters | 17.2 | 44 |
| Next nineteen liters | 32.2 | 39 |
| Next four liters | 4.5 | 29 |
| Next four liters | 7.7 | 26 |

The further purification of the above product is carried out as follows: 1.5 g. of crude actinobolin assaying 20 units per mg. is dissolved in 50 ml. of water and the solution is percolated through a columnar exchanger prepared by pouring an aqueous slurry of 62 ml. of sodium aluminum silicate (Decalso) adjusted to pH 6 with dilute hydrochloric acid, into a one-inch column. The column is washed with 100 ml. of water and eluted with a mixture of acetic acid (5%), ethanol (10%) and water (85%). The eluate characterized by a pink color is collected, concentrated by evaporation in vacuo to remove ethanol, and dried from the frozen state. The dry residue is dissolved in 25 ml. of water and the solution added to an adsorption column prepared by charging a slurry of 10 g. of activated carbon (Darco G–60) and 10 g. of diatomaceous earth into a column one inch in diameter. The column is washed with 100 ml. of water and is then eluted with 250 ml. of 20% aqueous acetone. The eluate characterized by a distinct red color is collected, and a portion is concentrated by evaporation in vacuo to remove acetone. A portion of the acetone-free aqueous solution is then dried from the frozen state. The product, which assays 72 units of actinobolin as the acetate salt per milligram, is characterized by an ultraviolet absorption maximum at a wave-length of 263 millimicrons $$(E_{1\,cm.}^{1\%} = 225)$$

Actinobolin acetate is obtained in crystalline form by employing any of the following methods (a), (b) and (c):

(a) 212 mg. of the above dried product is dissolved in water (0.1 ml.) and 3 ml. of absolute methanol is added to the solution. The resulting pink precipitate is removed by centrifugation and 6 ml. of acetone is added to the supernate. The precipitate which forms is removed by centrifugation and the supernate is concentrated to dryness. The residue is extracted with 10 ml. of warm acetone and the resulting precipitate removed by centrifugation. The acetone supernate is concentrated to 5 ml., 2–3 ml. of ether is added, and the resulting pink precipitate is removed by centrifugation. The supernate is taken to dryness and the residual product, which crystallizes on standing, is recrystallized from acetone. The crystalline product, actinobolin acetate melts partially at 128–133° C., resolidifies at approximately 145° C. and finally melts with decomposition at 263–266° C. with reference to inhibition of the growth of *Sarcina lutea* PCI 1001 W, the product assays 80 units per milligram. Hydrogen binding titration of an aqueous solution of the product shows pKa's of 4.6, 7.5 and 8.8 and a molecular weight of approximately 368. The product is very soluble in water, less soluble in warm absolute ethanol and sparingly soluble in cold absolute ethanol. It has an optical rotation $[\alpha]_D^{26}$ of $+58°$ (c.=0.5% in water). Analysis: C, 49.60%; H, 7.05%; N, 7.86% and O, 35.45% (by difference). This analysis is typical of the results obtained with various samples of actinobolin acetate, that is about 49.6% carbon, 7.05% hydrogen, 7.86% nitrogen and 35.45% oxygen. Actinobolin acetate gives a positive ninhydrin test and a deep red color with ferric chloride. The product possesses a unique ultraviolet absorption spectrum with a single maximum at 264 millimicrons $$(E_{1\,cm.}^{1\%} = 240)$$

in phosphate buffer at pH 7, at 262.5 millimicrons $$(E_{1\,cm.}^{1\%} = 263)$$

in 0.1 N hydrochloric acid and at 289 millimicrons $$(E_{1\,cm.}^{1\%} = 289)$$

in 0.1 N sodium hydroxide. The product shows an $R_f$ value between 0.12 and 0.19 in solvent system of n-butanol (10), acetic acid (1) and water (4). The product is also characterized by a characteristic infrared absorption spectrum with maxima at wave lengths 2.98, 3.07, 3.26, 5.81, 5.98, 6.20, 6.45, 6.58, 6.97, 7.09, 7.69, 7.80, 7.92, 8.11, 8.20, 8.37, 8.77, 8.96, 9.10, 9.26, 9.47, 9.63, 10.78, 11.78, 12.07, 13.15 and 13.38 microns. (see FIGURE 3).

(b) 125 ml. of an acetone-free aqueous solution obtained from the last-mentioned eluate and containing 149,000 units of actinobolin as the acetate salt is added to a columnar exchanger prepared by packing 25 ml. of a carboxylic acid resin (Amberlite IRC-50) in acid form in a one inch diameter column (hold-up volume, 15 ml.; gravity flow rate, 60 ml. per hour). The effluent is collected and the column is washed with 15 ml. of water. The effluent and washings are collected, concentrated in vacuo and dried from the frozen state. The residual solid is dissolved in boiling acetone and the solution concentrated by slow evaporation of the solvent. The resulting crystalline actinobolin acetate is recrystallized from hot absolute ethanol. The properties of this product are identical with those of the product of (a) above.

(c) A 330 ml. portion of the last-mentioned carbon eluate is concentrated under vacuum to remove the acetone. An aqueous solution of 0.043 molar ethylene diaminetetraacetic acid having a pH of 6.0 is added to the residue, containing 260,000 uits of actinobolin as the acetate salt until the resulting solution is colorless and the solution is then dried from the frozen state. The residual product is extracted with hot acetone, the acetone solution is concentrated and an excess of ethyl acetate is added. Actinobolin acetate which separates as a colorless precipitate is purified by recrystallization from hot absolute ethanol. The properties of the crystalline product are the same as those of the products of (a) and (b) above.

EXAMPLE 2

100 milligrams of crystalline actinobolin acetate are dissolved in 10 ml. of water and the pH adjusted to 1.2 with dilute aqueous, sulfuric acid. After standing for five hours at room temperature, the solution is mixed with 5 ml. of a weak anion exchange resin (Amberlite IR-45) in the hydroxyl form and the mixture stirred until the pH increases to 3.5. The resin is removed by filtration and the filtrate dried from the frozen state. The product, actinobolin sulfate, can be purified by recrystallization from aqueous ethanol. The recrystallized product is a white crystalline substance which is very soluble in water, very sparingly soluble in absolute ethanol and insoluble in acetone, ether, etc. Hydrogen binding titration in water shows pKa's of 7.5 and 8.8. The ultraviolet absorption spectrum shows only one maxima at 264 millimicrons $$(E_{1\,cm.}^{1\%} = 253)$$

in phosphate buffer at pH 7, at 263 millimicrons $$(E_{1\,cm.}^{1\%} = 266)$$

in 0.1 N hydrochloric acid and at 288 millimicrons $$(E_{1\,cm.}^{1\%} = 406)$$

in 0.1 N sodium hydroxide. The infrared spectrum shows characteristic maxima at wave lengths 2.90, 3.26, 5.90, 6.00, 6.18, 6.39, 6.59, 7.16, 7.85, 8.12, 8.21, 8.75, 8.96, 9.15, 9.32, 9.46, 11.20, 12.40 and 13.16 microns (see FIGURE 4).

Recrystallized actinobolin sulfate prepared as described above shows by microanalysis a carbon content of about 42 to 42.5%, a hydrogen content of about 6.6 to 6.7%, a nitrogen content of about 7.5 to 7.8%, an ionic sulfate content of about 15.7% and from 0 to 1.06% ash. These analyses indicate a probable empirical formula of $C_{13}H_{22-24}N_2O_6 \cdot \frac{1}{2}H_2SO_4 \cdot H_2O$ for the product recrystallized from aqueous ethanol.

EXAMPLE 3

A solution of one gram of crystalline actinobolin sulfate in 15 ml. of water is percolated slowly through a column containing 12 ml. of a weak anion exchange resin (Amberlite IR-45) in the hydroxyl form. The column is washed with water until the washings are no longer alkaline. The effluent and washings are collected and dried from the frozen state under vacuum. The actinobolin free base so obtained is a white substance which is very soluble in water and moderately soluble in lower aliphatic alcohols such as methanol. The product is optically active $[\alpha]_D^{28} = +59°$ (c.=0.5% in phosphate buffer at pH 7). It gives a positive ninhydrin test, forms a deep red color with ferric chloride and reduces Fehling's solution. The product has a ultraviolet absorption spectrum which has one maxima at wave length 263 millimicrons at pH 7 in phosphate buffer, at 262 millimicrons in 0.1 N hydrochloric acid and at 288 millimicrons in 0.1 N sodium hydroxide. The ultraviolet absorption spectra in these different media are shown in FIGURE 1. The infrared absorption spectrum of actinobolin (FIGURE 2) shows characteristic maxima at 2.90, 3.20, 3.30, 3.36, 6.04, 6.27, 6.85, 7.09, 7.86, 8.10, 8.39, 8.77, 8.95, 9.28, 9.45, 9.93, 11.42, 11.74 and 13.08 microns. Microanalysis of the product (dried at 50° C.) shows an average of about 50.22% carbon 6.88% hydrogen and 9.17% nitrogen.

EXAMPLE 4

A solution of 500 mg. of aluminum chloride in 10 ml. of ethanol is added to a solution of 200 mg. of crystalline actinobolin acetate in 2 ml. of warm absolute ethanol. A precipitate forms which on cooling to 0° C. is isolated by filtration and washed with cold ethanol and with ethyl acetate. The filter cake is dried under vacuum and dissolved in water. The aqueous solution is dried from the frozen state and the residual product triturated with absolute ethanol and then dried under vacuum. The resulting aluminum complex of actinobolin has an optical rotation $[\alpha]_D^{26}$ of $+138°$ (1% in phosphate buffer, pH 7.0). The product exhibits a characteristic ultraviolet absorption maximum at a wave-length of 263 millimicrons at pH 7 in phosphate buffer.

EXAMPLE 5

(a) 91 liters of incubated culture mixtures of *S. griser-viridus* var. *atrofaciens* (prepared as described in Example 1) is adjusted to pH 2 with sulfuric acid, slurried with 2% weight/volume diatomaceous earth (Celite #545) and filtered. The filtrate assaying 12.6 million *S. lutea* units is adjusted to pH 4 with alkali and stirred with 6 kg. of activated charcoal (Darco G-60) for thirty minutes. Diatomaceous earth, 2.25 kg. (Celite #545) is added and the mixture filtered through a 12 inch plate and frame Schriver filter press precoated with 640 g. of diatomaceous earth. The carbon cakes are washed with 20 liters of water. The filtrate and washings assay less than 2 *S. lutea* units/ml. The press is eluted with four 15 liter portions of 40% aqueous acetone followed by elution with 40 liters of 30 to 40% aqueous acetone. The combined eluates were adjusted to pH 3.5 with sulfuric acid and concentrated in vacuo to 22 liters.

8 liters of sodium aluminum silicate (Decalso) is slurried with water and treated with hydrochloric acid until the pH remains at 6.0 for thirty minutes. The sodium aluminum silicate is then packed into a glass pipe (6 inch internal diameter) and rinsed with water. The 22 liters of concentrate prepared above are passed over the absorbent and the column washed with 30 liters of water. The column is eluted with 5% aqueous acetic acid containing 10% methanol or ethanol (20 liters). The eluate (21.5 liters) is concentrated in vacuo to a volume of 8.5 liters.

2.5 kg. of activated carbon (Darco G-60) and 2.5 kg. of diatomaceous earth (Celite #545) are slurried together in water, pumped into a 6 inch internal diameter glass pipe and rinsed with water under 6 pounds pressure. The 8.5 liters of concentrate is passed through the column and the column rinsed with 35 liters of water. The column is eluted with 20% acetone. The following fractions are obtained after the break through of the acetone front.

| Fraction | Volume (liters) | S. lutea units |
| --- | --- | --- |
| 1 | 1 | 1.9 million. |
| 2 | 1.25 | 1.87 million. |
| 3 | 8.2 | 1.67 million. |

The second fraction is adjusted to pH 3.5 with sulfuric acid and concentrated in vacuo to 900 ml. 860 ml. of this concentrate which has a pH of 3.2 is mixed with 150 ml. of a 0.02 M solution of N-nitrosophenylhydroxylamine (cupferron) in 50:50 n-butanol-chloroform solution with rapid stirring. The layers are separated and the extraction repeated with an additional 100 ml. of solution. The clear light yellow aqueous solution is then extracted with two 150 ml. portions of chloroform and the aqueous layer readjusted to pH 3.2 with sulfuric acid. The aqueous layer is concentrated in vacuo and dried from the frozen state. The actinobolin sulfate so obtained is purified by recrystallization from 25 ml. of water and 45 ml. of ethanol to obtain 13.1 g. of pure actinobolin sulfate;

$[\alpha]_D^{26} = +54.5°$ (c.=1% in water); $\lambda$ max 264 m$\mu$ at pH 7 in phosphate buffer. Analysis: C, 42.28%; H, 6.45%; N, 7.49%; $SO_4^=$, 15.3%. The analysis indicates a probable empirical formula for the recrystallized product of $C_{13}H_{22-24}N_2O_6 \cdot \frac{1}{2}H_2SO_4 \cdot H_2O$. Assay 80 to 90 *S. lutea* units/mg.

The actinobolin present in fractions 1 and 3 can be isolated as described above or by the methods described in Example 1.

Actinobolin sulfate is very soluble in water, sparingly soluble in absolute ethanol and insoluble in acetone and ether. It cannot be extracted from aqueous solution with n-butanol, ethyl ether, amyl acetate, heptane and benzene. Potentiometric titration in water indicates a molecular weight of 352 with pKa values at 7.5 and 8.8. The product contains one non-basic nitrogen atom and one basic nitrogen atom in salt formation, at least one OH group and a carbonyl (CO) group. The product does not react with excess hydroxylamine hydrochloride in aqueous ethanol at room temperature.

Actinobolin sulfate reacts with ferric iron, aluminum ion, cupric ion and cobaltous ion in aqueous solution to form complexes. The aluminum complex is identical with that obtained from actinobolin free base and actinobolin acetate and has the same characteristics as set forth in Example 4.

Treatment of actinobolin sulfate in aqueous sodium bicarbonate solution with excess iodine causes rapid destruction of the ultraviolet absorbance and the ability to inhibit the growth of *Sarcina lutea* PCI 1001W. Treatment with aqueous alkali also causes the disappearance of the ultraviolet absorbance and ability to inhibit *Sarcina lutea* PCI 1001W. Warming the salt with 6 N sulfuric acid causes the liberation of one equivalent of carbon dioxide and the destruction of the ultraviolet absorbance and ability to inhibit the growth of *Sarcina lutea* PCI 1001W.

Actinobolin sulfate has an ultraviolet absorption spectrum which exhibits one maxima at 264 millimicrons in phosphate buffer at pH 7, at 263 millimicrons in 0.1 N hydrochloric acid and at 288 millimicrons in 0.1 N sodium hydroxide. The infrared absorption spectrum shows characteristic maxima at 2.90, 3.26, 5.90, 6.00, 6.18, 6.39, 6.59, 7.16, 7.85, 8.12, 8.21, 8.75, 8.96, 9.15, 9.32, 9.46, 11.20 12.40 and 13.16 microns.

Actinobolin sulfate gives a positive ninhydrin test, a positive Folin-Ciocalteu test, a positive iodoform test, a negative Molisch test, a negative Ehrlich test and a negative Elson-Morgan test. It reduces Fehling's solution, decolorizes aqueous potassium permanganate in the cold, gives a deep red color with ferric chloride and gives a red-orange color with Pauli diazo reagent. It does not absorb hydrogen at room temperature and at 2 to 3 atmospheres pressure in either ethanol or acetic acid in the presence of Adams or Raney nickel catalysts.

(b) 1 g. of actinobolin sulfate (prepared above) is dissolved in water and passed over a column containing 12 ml. of a weak anion exchange resin (Amberlite IR-45) in the hydroxyl form. The column is rinsed well with water and the combined effluent and washings dried from the frozen state. The actinobolin free base is obtained as an amorphous fluffy white powder; yield 0.67 g.; $\lambda$ max 263 m$\mu$ in phosphate buffer at pH 7.0; assay 97 *S. lutea* units/mg. Analysis after drying at 50° C.: C, 50.31%; H, 6.88%; N, 9.17%; O, 33.64 (by diff.). The dried product was very hygroscopic. The analysis indicates the presence of $\frac{1}{2}H_2O$ and an empirical formula for actinobolin of $C_{13}H_{20-22}N_2O_6$.

The actinobolin free base has an optical rotation $[\alpha]_D^{28}$ of $+59°$ (c.=0.5% in phosphate buffer at pH 7). It is very soluble in water and moderately soluble in methanol and ethanol. It cannot be extracted from aqueous solution with n-butanol, ethyl ether, heptane, amyl acetate or benzene. It gives a positive ninhydrin test, a positive Folin-Ciocalteu test, a positive iodoform test, a negative Molisch test, a negative Ehrlich test and a negative Elson-Morgan test. It reduces Fehling's solution, decolorizes aqueous potassium permanganate in the cold, gives a deep red color with ferric chloride and gives a red-orange color with Pauli diazo reagent. It does not absorb hydrogen at room temperature and 2 to 3 atmospheres pressure in either ethanol or acetic acid in the presence of Adams or Raney nickel catalysts.

Actinobolin free base is amphoteric. Potentiometric titration shows pKa values of 7.5 and 8.8 It contains one basic nitrogen atom and one non-basic nitrogen atom, at least one OH group and a

group. The

group does not react with excess hydroxylamine hydrochloride in aqueous ethanol at room temperature.

Actinobolin free base reacts with aluminum ions, ferric ions, cupric ions and cobaltous ions to form complexes. These complexes are identical with those produced from the acetate and sulfate salts.

Treatment of actinobolin free base with excess iodine in aqueous sodium bicarbonate solution, with aqueous alkali or warming with 6 N sulfuric acid at 100° C. causes the destruction of the ability to inhibit *Sarcina lutea* PCI 1001W and the ultraviolet absorbance. The sulfuric acid treatment also causes the liberation of one equivalent of carbon dioxide.

The product has an infrared spectrum identical with that of the actinobolin free base of Example 3.

Acid addition salts of actinobolin can be prepared directly from the solution of the free base obtained as the effluent from the column of the ion exchange resin. This is carried out by adding an equivalent amount of the acid to the effluent and drying the resulting solution from the frozen state. For example, to prepare the hydrochloride salt of actinobolin one adds an equivalent amount of hydrochloric acid to the effluent, performed most conveniently by simply adding sufficient hydrochloric acid to bring the pH to between 5 and 6, and dries the solution from the frozen state in vacuo. The hydrochloride salt so obtained is a white amorphous powder. The meta phosphate salt prepared by this method is also a white amorphous powder.

(c) 0.20 g. of actinobolin free base (prepared above) is dissolved in 0.7 ml. of absolute ethanol and 0.15 ml. of glacial acetic acid added followed by 3 ml. of ethyl acetate. After cooling, the product is collected by filtration, washed with ethyl acetate and dried in vacuo. The actinobolin acetate so obtained (0.21 g.) is recrystallized from 2 ml. of absolute ethanol. The white needles partially melt at 130° C. resolidify at 145° C. and melt with decomposition at 263–6° C.; $[\alpha]_D^{26} = +58°$ (c.=1% in water); λ max=264 mμ at pH 7.0; assay, 86 *S. lutea* units/mg. Analysis: C, 49.60%; H, 7.05%; N, 7.86%. The analysis indicates a probable empirical formula of $C_{15}H_{24-26}N_2O_8$. Potentiometric titration in water indicates a molecular weight of 368 with pKa values of 4.6, 7.5 and 8.8. The product is very soluble in water, less soluble in warm absolute ethanol and warm acetone and is sparingly soluble in ethyl acetate and cold absolute ethanol. It cannot be extracted from aqueous solutions with n-butanol, ethyl ether, amyl acetate, heptane or benzene.

Actinobolin acetate prepared by this method gives a positive ninhydrin test, a positive Folin-Ciocalteu test, a positive iodoform test, a negative Molisch test, a negative Ehrlich test and a negative Elson-Morgan test. It reduces Fehling's solution, decolorizes aqueous potassium permanganate in the cold, gives a deep red color with ferric chloride and gives a red-orange color with Pauli diazo reagent. It does not absorb hydrogen at room temperature and 2 to 3 atmospheres pressure in either ethanol or acetic acid in the presence of Adams or Raney nickel catalysts.

Actinobolin acetate contains one basic nitrogen atom in salt formation and one non-basic nitrogen atom, at least one OH group and a

group. The

group does not react with excess hydroxylamine hydrochloride in aqueous ethanol at room temperature. The salt forms complexes readily with aluminum ion, ferric ion, cupric ions and cobaltous ions.

Treatment of actinobolin acetate with excess iodine in aqueous sodium bicarbonate solution, with aqueous alkali or warming with 6 N sulfuric acid at 100° C. causes destruction of the ability to inhibit the growth of *Sarcina lutea* PCI 1001W and the ultraviolet absorbance.

The actinobolin acetate prepared by the above described method has an infrared absorption spectrum identical with the actinobolin acetate prepared as described in Example 1.

(d) 0.20 g. of actinobolin acetate (prepared as described above) is treated with 2 ml. of warm acetic anhydride and allowed to stand overnight at room temperature. The crystalline mixture is filtered, washed with ethyl acetate and dried in vacuo to obtain 0.16 g. of N-acetyl actinobolin. Recrystallization from absolute ethanol yields white needles melting at 254–5° C. (dec.); λ max 264 mμ at pH 7 in phosphate buffer; λ max 262 in 0.1 N hydrochloric acid; λ max 288 mμ in 0.1 N sodium hydroxide. Analysis: C, 52.73%; H, 6.52%; N, 8.25%. Potentiometric titration indicates a molecular weight of 338 and a pKa of 8.4. N-acetyl actinobolin does not exhibit any inhibition of the growth of *S. lutea* at a concentration of 0.74 mg./ml. The same product can be obtained by using actinobolin free base in the foregoing procedure.

This application is a continuation-in-part of our application Serial No. 601,038, filed July 30, 1956, now abandoned.

We claim:

1. Actinobolin, a white, optically active substance which contains only the elements carbon, hydrogen, nitrogen and oxygen; as the hemihydrate assays for 50.31% carbon, 6.88% hydrogen, 9.17% nitrogen and 33.64% oxygen by difference; has an optical rotation $[\alpha]_D^{28}$ of +59° at pH 7 in phosphate buffer; assays for a molecular weight of 302 by potentiometric titration measurements; is very soluble in water; is moderately soluble in methanol and in ethanol; is non-extractable from aqueous solutions with n-butanol, with ethyl ether, with amyl acetate, with n-heptane and with benzene; gives positive ninhydrin, Folin-Ciocalteu and iodoform tests; forms a deep red coloration with ferric chloride, forms a red-orange color with Pauli diazo reagent; decolorizes an aqueous solution of potassium permanganate in the cold; reduces Fehling's solution; gives negative Molisch, Ehrlich and Elson-Morgan tests; does not absorb hydrogen at room temperature and 2 to 3 atmospheres pressure in the presence of Raney nickel catalyst when dissolved in acetic acid and when dissolved in ethanol; does not absorb hydrogen at room temperature and 2 to 3 atmospheres pressure in the presence of Adams catalyst when dissolved in acetic acid and when dissolved in ethanol; is amphoteric; possesses $pK_a$ values of 7.5 and 8.8; contains one basic nitrogen atom and one non-basic nitrogen atom; contains at least one OH group; contains one

group which does not react with excess hydroxylamine hydrochloride in aqueous ethanol; forms a complex with ferric ion which is a deep red color; forms a complex with aluminum ion which has an optical rotation $[\alpha]_D^{26}$ of $+138°$ in water and a maximum ultraviolet absorbance at 263 m$\mu$ at ph 7 in phosphate buffer; forms complexes with cupric ion and with cobaltous ion; inhibits the growth of Sarcina lutea PCI 1001 W under conditions favorable to the growth of the microorganism; has a single characteristic ultraviolet absorption maximum at wave length 263 millimicrons in 0.1 N hydrochloric acid, at wave length 264 millimicrons in phosphate buffer at ph 7 and at wave length 288 millimicrons in 0.1 N sodium hydroxide; upon treatment with iodine in aqueous sodium bicarbonate solution loses its ability to inhibit the growth of Sarcina lutea PCI 1001 W and its ultraviolet absorbance; upon treatment with warm acetic anhydride yields an N-acetyl derivative which melts at 254–5° C. (dec.), has a p$K_a$ of 8.4 and does not inhibit the growth of Sarcina lutea PCI 1001 W; upon warming with 6 N sulfuric acid at 100° C. liberates carbon dioxide and loses its ultraviolet absorbance and ability to inhibit the growth of Sarcina lutea PCI 1001 W; has a characteristic infrared spectrum substantially as shown in FIGURE 2; forms a sulfate salt having an optical rotation $[\alpha]_D^{26}$ of $+54.5°$ in water and forms an acetate salt having an optical rotation $[\alpha]_D^{26}$ of $+58°$ in water.

2. Actinobolin acetate, said substance being an acetate of actinobolin as defined in claim 1.

3. Actinobolin sulfate, said substance being a sulfate of actinobolin as defined in claim 1.

4. A member of the class consisting of actinobolin as defined in claim 1 and acid-addition salts thereof.

5. Process for the production of actinobolin, which comprises inoculating a sterile aqueous nutrient medium containing an assimilable carbon source and a source of nitrogen and minerals with Streptomyces griseoviridus var. atrofaciens and incubating the inoculated medium at a temperature between about 20 to 35° C. under aerobic conditions.

6. Process for the production of actinobolin, which comprises inoculating a sterile aqueous nutrient medium having a pH between 6 and 8.5 and containing an assimilable carbon source and a source of nitrogen and minerals with Streptomyces griseoviridus var. atrofaciens, incubating the inoculated medium at a temperature between about 20 to 35° C. under aerobic conditions for about three to six days, and removing the actinobolin so produced from the incubated medium.

7. Process for the production of actinobolin which comprises inoculating a sterile aqueous nutrient medium having a pH between 6 and 8.5 and containing an assimilable carbon source, a source of nitrogen and minerals with the organism Streptomyces griseoviridus var. atrofaciens, incubating the inoculated medium at a temperature in the range from 23 to 30° C. while agitating and passing sterile air into the medium so as to cause the organism to develop as discrete particles dispersed inside the medium, and separating mycelia from the culture liquid after incubation thereby obtaining an aqueous mixture containing a high concentration of actinobolin.

References Cited in the file of this patent

UNITED STATES PATENTS

| | | |
|---|---|---|
| 2,908,611 | Dutcher et al. | Oct. 13, 1959 |
| 2,908,612 | Dutcher et al. | Oct. 13, 1959 |
| 2,909,517 | De Boer et al. | Oct. 20, 1959 |

OTHER REFERENCES

Pitillo et al.: Antibiotics Annual, 1958–59, pp. 497–532, pub. 1959 by Med. Encyl., Inc., New York, N.Y.